United States Patent
Okuda et al.

(10) Patent No.: US 9,281,542 B2
(45) Date of Patent: Mar. 8, 2016

(54) ELECTRICITY STORAGE DEVICE AND WELDING METHOD

(71) Applicant: KABUSHIKI KAISHA TOYOTA JIDOSHOKKI, Kariya-shi, Aichi-ken (JP)

(72) Inventors: Motoaki Okuda, Kariya (JP); Atsushi Minagata, Kariya (JP); Hidaka Yamada, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 0 days.

(21) Appl. No.: 14/432,235

(22) PCT Filed: Sep. 12, 2013

(86) PCT No.: PCT/JP2013/074666
§ 371 (c)(1),
(2) Date: Mar. 30, 2015

(87) PCT Pub. No.: WO2014/054400
PCT Pub. Date: Apr. 10, 2014

(65) Prior Publication Data
US 2015/0255831 A1    Sep. 10, 2015

(30) Foreign Application Priority Data
Oct. 3, 2012    (JP) ................... 2012-221442

(51) Int. Cl.
*H01M 10/0585*    (2010.01)
*H01M 2/26*    (2006.01)
(Continued)

(52) U.S. Cl.
CPC .......... *H01M 10/0585* (2013.01); *H01G 11/66* (2013.01); *H01G 11/74* (2013.01); *H01G 11/84* (2013.01); *H01M 2/26* (2013.01); *H01M 2/266* (2013.01); *H01M 10/0525* (2013.01);
(Continued)

(58) Field of Classification Search
None
See application file for complete search history.

(56) References Cited

U.S. PATENT DOCUMENTS 5,158,842 A * 10/1992 McHenry ............. H01M 2/266 429/161
2002/0094477 A1 * 7/2002 Sasaki ................. H01M 2/0285 429/161

FOREIGN PATENT DOCUMENTS

JP    2-256158 A    10/1990
JP    10-255753 A    9/1998
(Continued)

OTHER PUBLICATIONS

Machine translation of Yoshida JP 2003-187778.*
International Search Report of PCT/JP2013/074666, dated Oct. 29, 2013. [PCT/ISA/210]. PCT/IPEA/409.

*Primary Examiner* — Carlos Barcena
*Assistant Examiner* — Wojciech Haske
(74) *Attorney, Agent, or Firm* — Sughrue Mion, PLLC (57) ABSTRACT

An electricity storage device includes an electrode assembly configured such that first and second electrodes are layered. The electrode assembly includes two tab groups in each of which tabs of the first electrodes or the second electrodes having the same polarity are bundled. Each tab group and a conductive member are welded with each other by a welding portion. The welding portion has a mixed portion configured by mixing at least one of a metal that forms metal foils and a metal that forms the conductive member with a dissimilar metal that is different from the metal of the metal foils and has a higher electric resistivity than that of the metal of the metal foils.

6 Claims, 6 Drawing Sheets (51) Int. Cl.
*H01G 11/66* (2013.01)
*H01G 11/74* (2013.01)
*H01G 11/84* (2013.01)
*H01M 10/0525* (2010.01)

(52) U.S. Cl.
CPC ............ *H01M2220/20* (2013.01); *Y02E 60/13* (2013.01); *Y02T 10/7011* (2013.01); *Y02T 10/7022* (2013.01)

(56) References Cited

FOREIGN PATENT DOCUMENTS

| | | |
|---|---|---|
| JP | 2002-75322 A | 3/2002 |
| JP | 2002-298825 A | 10/2002 |
| JP | 2003-100278 A | 4/2003 |
| JP | 2003-187778 A | 7/2003 |
| WO | 2012/090600 A1 | 7/2012 |

\* cited by examiner

ELECTRICITY STORAGE DEVICE AND WELDING METHOD

CROSS REFERENCE TO RELATED APPLICATIONS

This application is a National Stage of International Application No. PCT/JP2013/074666 filed Sep. 12, 2013, claiming priority based on Japanese Patent Application No. 2012-221442, filed Oct. 3, 2012, the contents of all of which are incorporated herein by reference in their entirety.

FIELD OF THE INVENTION

The present invention relates to an electricity storage device that includes an electrode assembly and a method of welding tab groups of electrodes, which configure the electrode assembly.

BACKGROUND ART OF THE INVENTION

Figure 9:
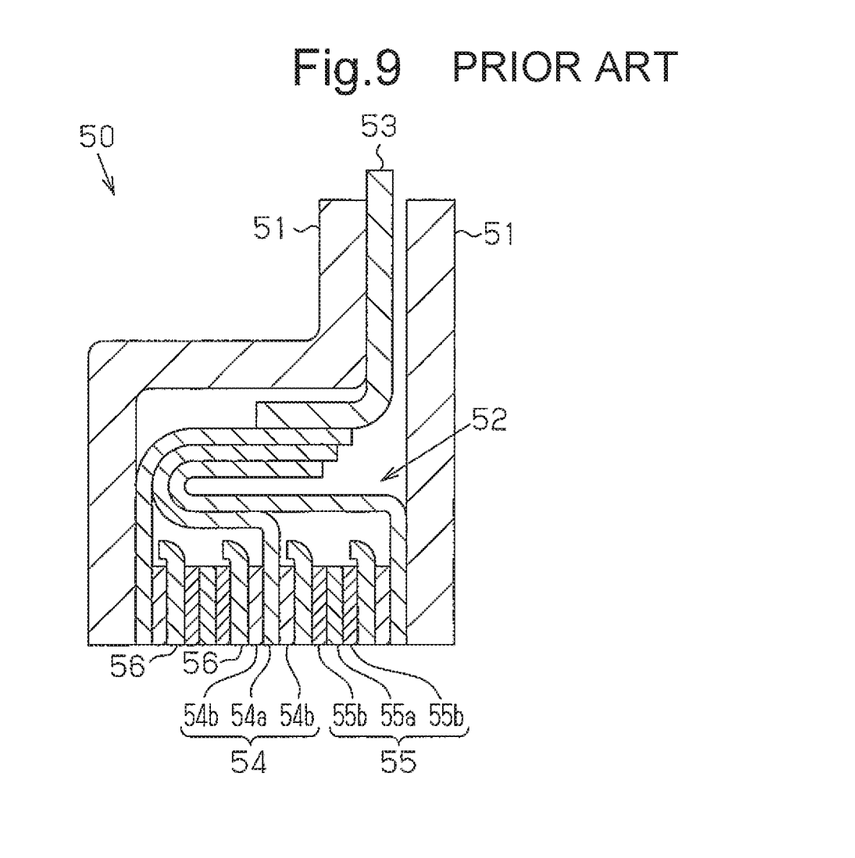
FIG. 9 is a cross-sectional view illustrating a conventional connecting form between a tab group and a conductive member.

A vehicle such as an electric vehicle (EV) and a plug-in hybrid vehicle (PHV) is equipped with a rechargeable battery as an electricity storage device that stores a power supply to a motor for running the vehicle. Patent Document 1 discloses such a rechargeable battery, for example. As shown in FIG. 9, a rechargeable battery 50 of Patent Document 1 has a case 51, which accommodates an electrode assembly 52. A conductive member 53 is connected to the electrode assembly 52 to connect the electrode assembly 52 and the electrode terminal to each other. The electrode assembly 52 includes negative electrodes 54 each having a metal foil 54a, to which negative electrode active material layers 54b are applied, and positive electrodes 55 each having a metal foil 55a, to which positive electrode active material layers 55b are applied. The electrode assembly 52 is formed to have a layered structure such that a separator 56 is located between each adjacent pair of the negative electrodes 54 and the positive electrodes 55. In the electricity storage device including the rechargeable battery 50 as in Patent Document 1, a tab, which is a region free from the active material, is formed on the metal foil 54a of each negative electrode 54 and the metal foil 55a of each positive electrode 55, for example. The tab group in which a plurality of the tabs is bundled is joined to the conductive member 53.

PRIOR ART DOCUMENT

Patent Document

Patent Document 1: Japanese Laid-Open Patent Publication No. 2002-298825

SUMMARY OF THE INVENTION

The tab group and the conductive member 53 are joined to each other by welding. The welding is performed by sandwiching the tab groups and the conductive member 53 between two welding electrodes. When a metal having a low electric resistivity such as copper is used for metal foils of the electrodes, the tab group formed of such metal foils is less likely to be heated to high temperatures when tab group is welded. Since the thickness of the conductive member 53 is greater than the thickness of the tab, heat is easily diffused from the conductive member 53 when the conductive member 53 is welded to the tab group. Accordingly, when the tab group and the conductive member 53 are welded, a poor weld may occur between the tab group and the conductive member 53. This may cause a loss of power in the rechargeable battery 50.

An objective of the present invention is to provide an electricity storage device and a welding method that limit a loss of power caused by poor welding between a tab group of electrodes and a conductive member.

In order to achieve the above described objective, an electricity storage device includes: first electrodes; second electrodes; an electrode assembly; two electrode terminals; two conductive members; two tab groups; and a case. Each of the first electrodes includes a metal foil to which an active material is applied. The metal foil includes a tab shaped to protrude from an edge of the metal foil. Each of the second electrodes includes a metal foil to which an active material is applied. The metal foil includes a tab shaped to protrude from an edge of the metal foil, and the second electrodes have a polarity that is different from a polarity of the first electrodes. The electrode assembly is configured such that the first electrodes and the second electrodes are layered in a state in which the first electrodes and the second electrodes are insulated from each other. One of the electrode terminals transfers electricity to and receives electricity from the first electrodes, and the other electrode terminal transfers electricity to and receives electricity from the second electrodes. The conductive members are electrically connected to the electrode assembly and the corresponding electrode terminals. The tab groups are provided in the electrode assembly. One of the tab groups is configured by bundling the tabs of the first electrodes having the same polarity, and the other tab group is configured by bundling the tabs of the second electrodes having the same polarity. The case accommodates the conductive member and the electrode assembly. Each tab group and the corresponding conductive member are welded by a welding portion. The welding portion has a mixed portion configured by mixing metal that forms the metal foil and the conductive member with a dissimilar metal that is different from the metal of the metal foil and has a higher electric resistivity than that of the metal of the metal foil.

According to a second aspect of the present invention, a welding method for joining a tab group, in which tabs extending from metal foils are bundled, with a conductive member, which is electrically connected to the tab group, by welding at edges of electrodes, which configure an electrode assembly having a layered structure is disclosed. The method includes a step of providing a dissimilar metal member between the tab group and the conductive member. The dissimilar metal member has a higher electric resistivity than an electric resistivity of a metal of the metal foils and is formed of a metal of a type that is different from a type of the metal of the metal foils, and a region of the dissimilar metal member is smaller than a contact region between the conductive member and a first welding electrode, which is arranged in contact with the conductive member. The method further includes the steps of: sandwiching the tab group and the conductive member between the first welding electrode and a second welding electrode, which is arranged in contact with the tab group; and welding the tab group and the conductive member with each other such that a region to be welded contains a region in which the dissimilar metal member is provided.

DETAILED DESCRIPTION OF THE PREFERRED EMBODIMENTS

Hereinafter, an electricity storage device according to one embodiment will be described according to FIGS. 1 to 8.

Figure 1:
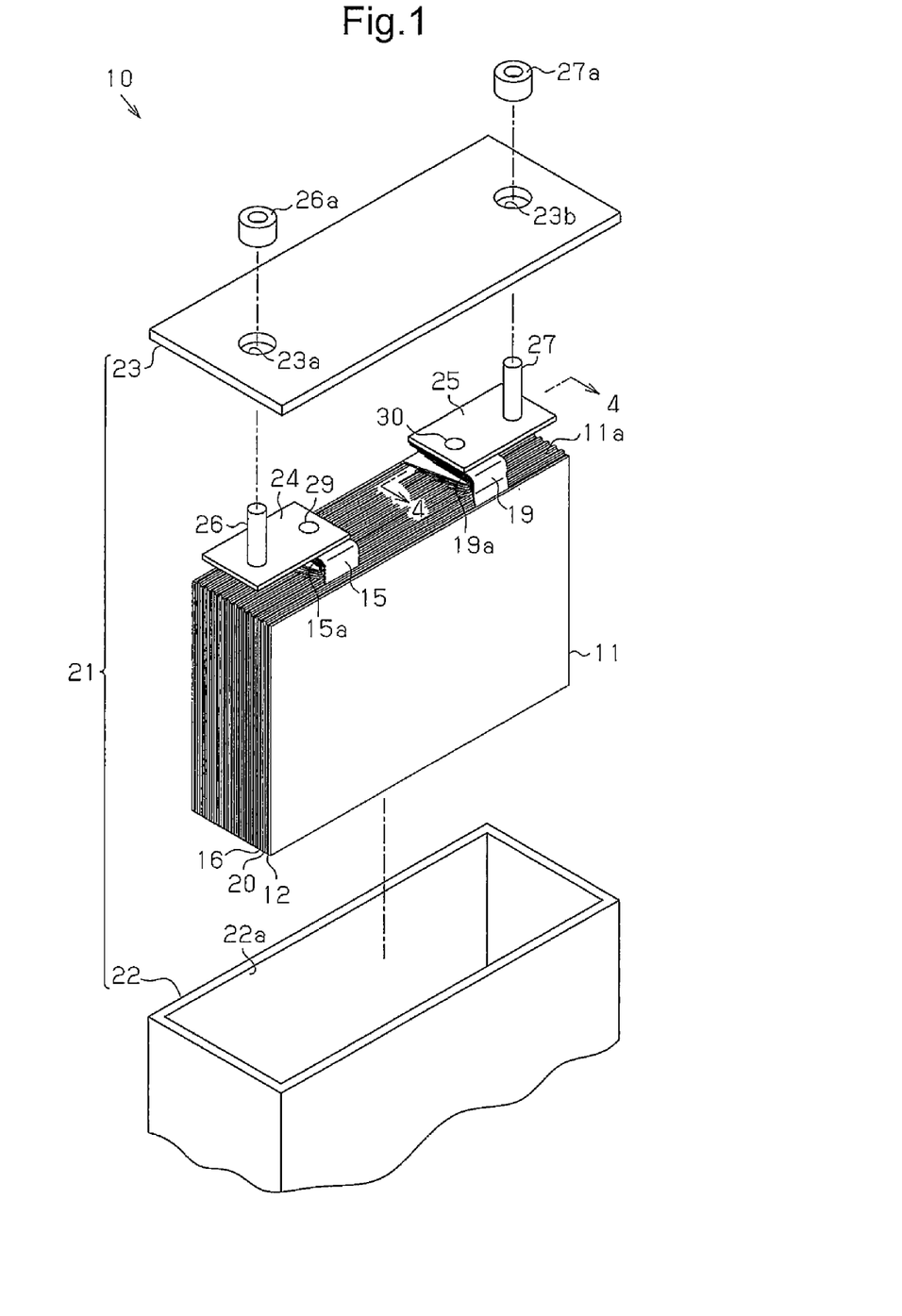
FIG. 1 is an exploded perspective view illustrating a rechargeable battery according to one embodiment.
Figure 2:
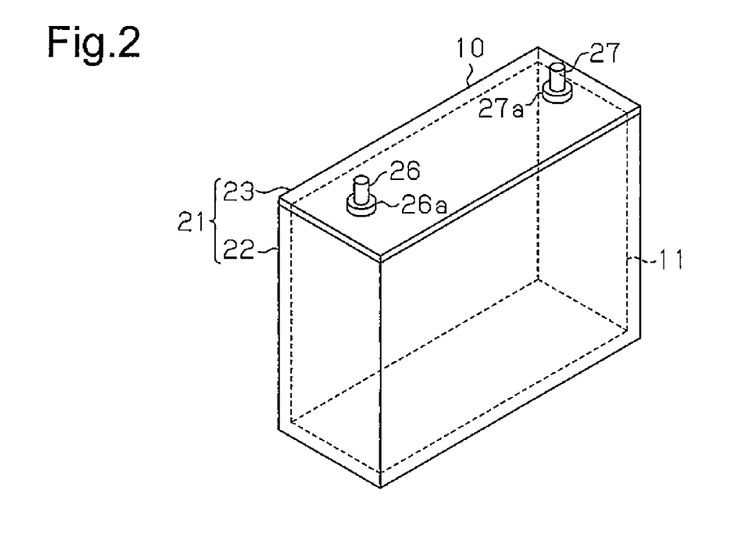
FIG. 2 is a perspective view illustrating an appearance of the rechargeable battery.

As shown in FIGS. 1 and 2, a rechargeable battery 10, which is an electricity storage device, includes a case 21 and an electrode assembly 11 accommodated in the case 21. The case 21 includes a box-like case body 22 and a rectangular plate-like lid body 23, which closes the opening 22a of the case body 22. The case body 22 and the lid body 23 are formed of metal (e.g., stainless steel and aluminum). The rechargeable battery 10 according to the present embodiment is a rectangular battery that has a rectangular outline. The rechargeable battery 10 according to the present embodiment is a lithium ion battery.

Electrode terminals including a positive electrode terminal 26 and a negative electrode terminal 27 are electrically connected to the electrode assembly 11. The positive electrode terminal 26 and the negative electrode terminal 27 transfer electricity to and receive electricity from the electrode assembly 11. The positive electrode terminal 26 and the negative electrode terminal 27 are exposed to the outside of the case 21 through two holes 23a and 23b formed in the lid body 23 at a predetermined distance. Ring-shaped insulating members 26a and 27a for insulating the positive electrode terminal 26 and the negative electrode terminal 27 from the case 21 are respectively attached to the positive electrode terminal 26 and the negative electrode terminal 27.

Figure 3:
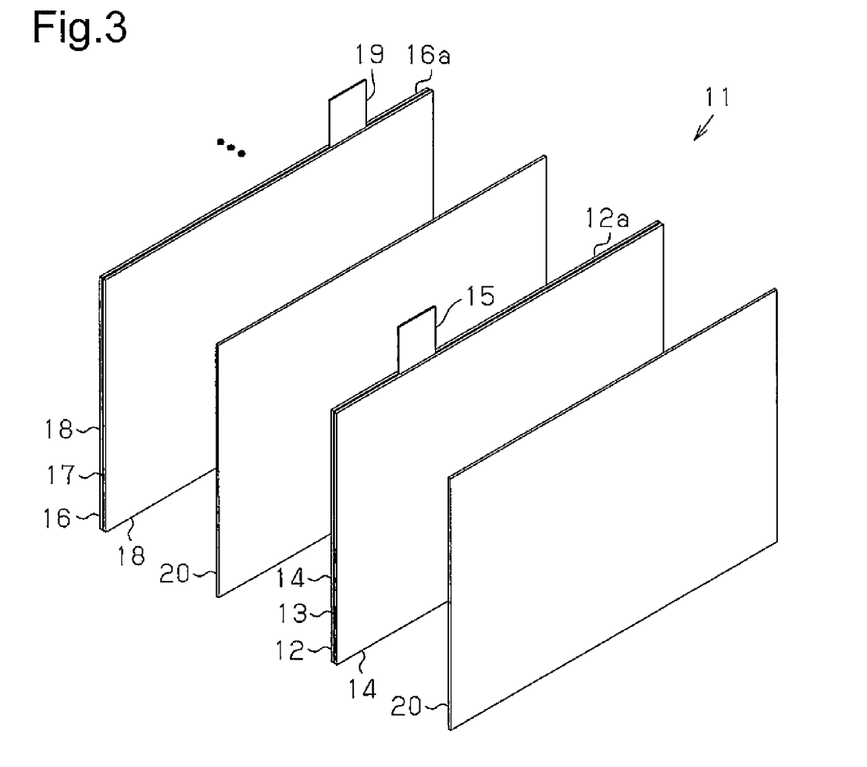
FIG. 3 is an exploded perspective view illustrating components of the electrode assembly.

As shown in FIG. 3, the electrode assembly 11 includes positive electrodes 12 as sheet-like first electrodes and negative electrodes 16 as sheet-like second electrodes. Each positive electrode 12 includes a positive electrode metal foil 13 and positive electrode active material layers 14 configured by applying positive electrode active materials to the sides of the positive electrode metal foil 13. The positive electrode metal foil 13 is an aluminum foil. Each negative electrode 16 includes a negative electrode metal foil 17 and negative electrode active material layers 18 configured by applying negative electrode active materials to the sides of the negative electrode metal foil 17. The negative electrode metal foil 17 is a copper foil. The electrode assembly 11 has a layered structure in which a separator 20 is located between each adjacent pair of the positive electrodes 12 and the negative electrodes 16. Each separator 20 insulates the corresponding pair of the positive electrode 12 and the negative electrode 16 from each other. The electrode assembly 11 is configured such that the positive electrodes 12 and the negative electrodes 16 are layered. That is, the electrode assembly 11 includes a plurality of sets each of which includes a positive electrode 12, a negative electrode 16, and a separator 20.

A positive electrode tab 15, which is formed of a positive electrode metal foil 13 and shaped to protrude, extends from a part of the edge portion 12a of each positive electrode 12. A negative electrode tab 19, which is formed of a negative electrode metal foil 17 and shaped to protrude, extends from a part of the edge portion 16a of each negative electrode 16. The positive electrode tabs 15 and the negative electrode tabs 19 are provided at positions at which the positive electrode tabs 15 and the negative electrode tabs 19 are not layered in the state in which the positive electrodes 12 and the negative electrodes 16 are layered.

The positive electrodes 12, which configure the electrode assembly 11, are layered such that the positive electrode tabs 15 are aligned. The negative electrodes 16, which configure the electrode assembly 11, are layered such that the negative electrode tabs 19 are aligned in the same manner. As shown in FIG. 1, a positive electrode tab group 15a, in which the positive electrode tabs 15 are bundled from an end to the other end of the electrode assembly 11 in the layering direction, is provided on the edge 11a of the electrode assembly 11. Also, a negative electrode tab group 19a, in which the negative electrode tabs 19 are bundled from an end to the other end of the electrode assembly 11 in the layering direction, is provided on the edge 11a of the electrode assembly 11 in the same manner. A metal positive electrode conductive member 24 (made of aluminum according to the present embodiment) for electrically connecting the electrode assembly 11 and the positive electrode terminal 26 is joined to the positive electrode tab group 15a. Also, a metal negative electrode conductive member 25 (made of copper according to the present embodiment) for electrically connecting the electrode assembly 11 and the negative electrode terminal 27 is joined to the negative electrode tab group 19a. The positive electrode conductive member 24 and the negative electrode conductive member 25 form a rectangular plate-like shape. The thickness of each of the positive electrode conductive member 24 and the negative electrode conductive member 25 is greater than the thicknesses of the corresponding positive electrode tab 15 and the negative electrode tab 19.

Figure 4:
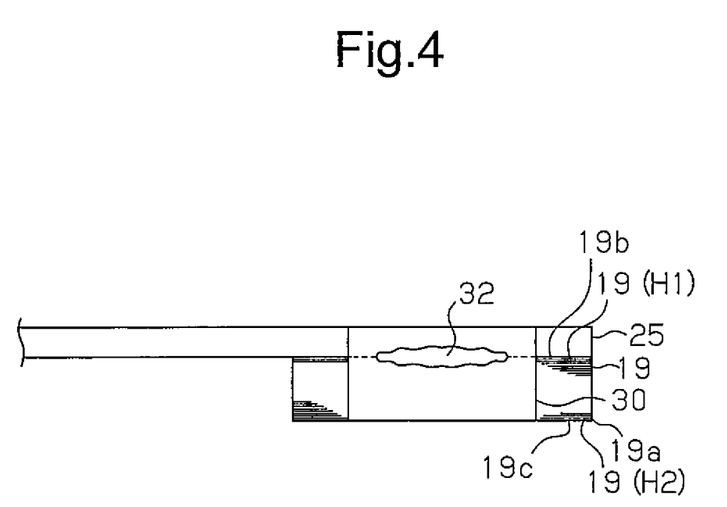
FIG. 4 is a cross-sectional view taken along line 4-4 of FIG. 1, illustrating a tab group and a conductive member.

As shown in FIG. 4, the negative electrode tab group 19a and the negative electrode conductive member 25 are joined to each other by welding. In such a state, a mixed portion 32 is formed across the negative electrode tab group 19a and the negative electrode conductive member 25 by mixing the copper that forms the negative electrode metal foil 17, the metal that forms the negative electrode conductive member 25, and a dissimilar metal. The dissimilar metal is a metal that is different from copper, which forms the negative electrode metal foil 17, and from the metal that forms the negative electrode conductive member 25.

Next, a method of welding the negative electrode tab group 19a and the negative electrode conductive member 25 will be described.

Figure 5:
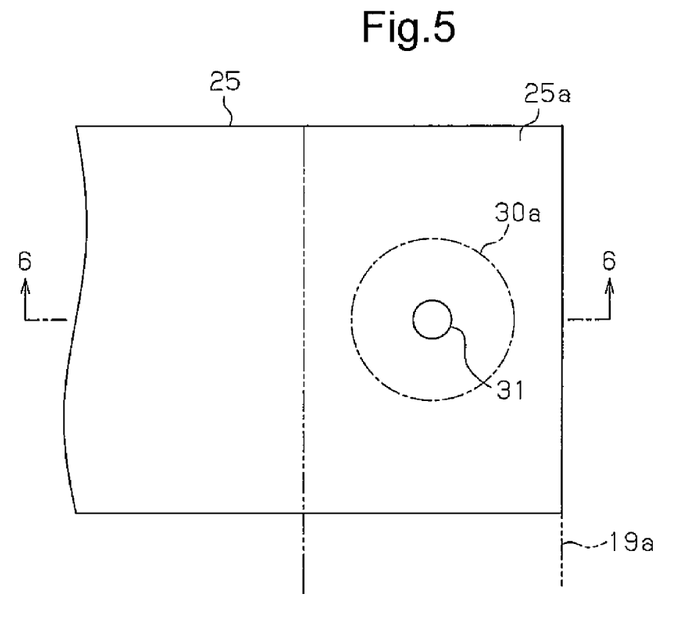
FIG. 5 is an explanatory view illustrating a way of plating a dissimilar metal on the conductive member.
Figure 6:
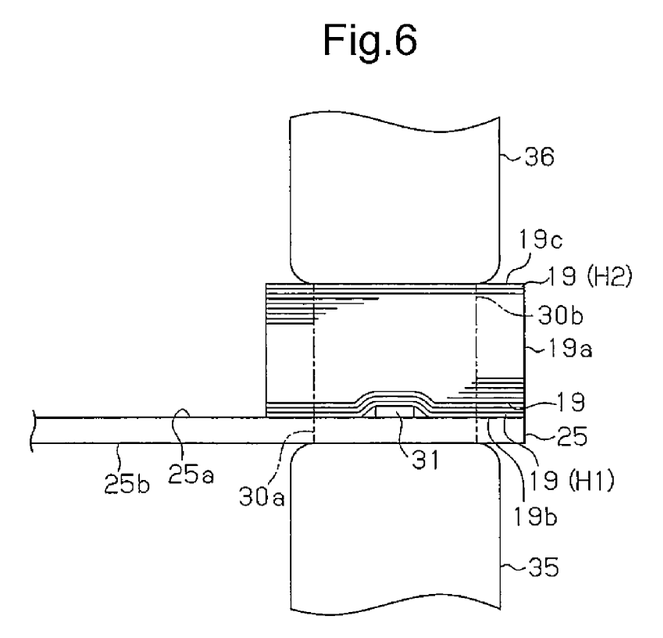
FIG. 6 is a cross-sectional view taken along line 6-6 of FIG. 5, illustrating the tab group and the conductive member in the state prior to welding.

As shown in FIGS. 5 and 6, when the negative electrode tab group 19a and the negative electrode conductive member 25 are welded, a first welding electrode 35 is arranged to contact the negative electrode conductive member 25. A reference numeral "H1" is assigned to the negative electrode tab 19 that is located at a position closest to the negative electrode conductive member 25 of the negative electrode tabs 19 bundled as the negative electrode tab group 19a in FIG. 6. A reference numeral "H2" is assigned to the negative electrode tab 19 that is located at a position opposite to the negative electrode tab 19 (H1) in FIG. 6. A second welding electrode 36 is arranged to contact the negative electrode tab 19 (H2). The first welding electrode 35 and the second welding electrode 36 are provided as described above. This sandwiches the negative electrode tab group 19a and the negative electrode conductive member 25 between the first welding electrode 35 and the second welding electrode 36.

A dissimilar metal member 31 is located between the negative electrode tab group 19a and the negative electrode conductive member 25. The dissimilar metal member 31 is formed of a dissimilar metal that is different from copper, which forms the negative electrode metal foil 17, and has a higher electric resistivity than that copper. As the dissimilar metal member 31, a member that is formed of metal containing nickel is employed. Specifically, the negative electrode conductive member 25 includes the surfaces 25a and 25b. The dissimilar metal member 31 is located between the surface 25a, which faces the negative electrode tab group 19a and the surface 19b of the negative electrode tab 19 (H1), which faces the surface 25a. The dissimilar metal member 31 is formed by plating the surface 25a of the negative electrode conductive member 25 with the dissimilar metal. The region of the surface 25a on which the dissimilar metal member 31 is provided in the direction along the surfaces 25a and 25b of the negative electrode conductive member 25 is smaller than the contact region 30a on the surface 25b, which contacts the first welding electrode 35. That is, according to the present embodiment, the dissimilar metal member 31 on the surface 25a of the negative electrode conductive member 25 has an area that is less than the area of the two-dimensional region of the contact region 30a in the direction along the surfaces 25a and 25b and is included in the two-dimensional region of the contact region 30a. Also, the dissimilar metal member 31 has a volume that is less than the volume of the three-dimensional region as a region in which the contact region 30a extends from the negative electrode tab 19 (H1) to the negative electrode tab 19 (H2) of the negative electrode tab group 19a, and is included in the three-dimensional region of the contact region 30a. In the direction along the surface 19c of the negative electrode tab 19 (H2), the surface 19c contacts the second welding electrode 36 by the contact region 30b. Further, in the layering direction of the negative electrode tab group 19a, the region in which the dissimilar metal member 31 is located is included in the region extending from the contact region 30a on the surface 25b of the negative electrode conductive member 25, which contacts the first welding electrode 35, toward the contact region 30b on the surface 19c of the negative electrode tab 19 (H2), which contacts the second welding electrode 36 (shown by a long dashed short dashed line in FIG. 6).

Figure 7:
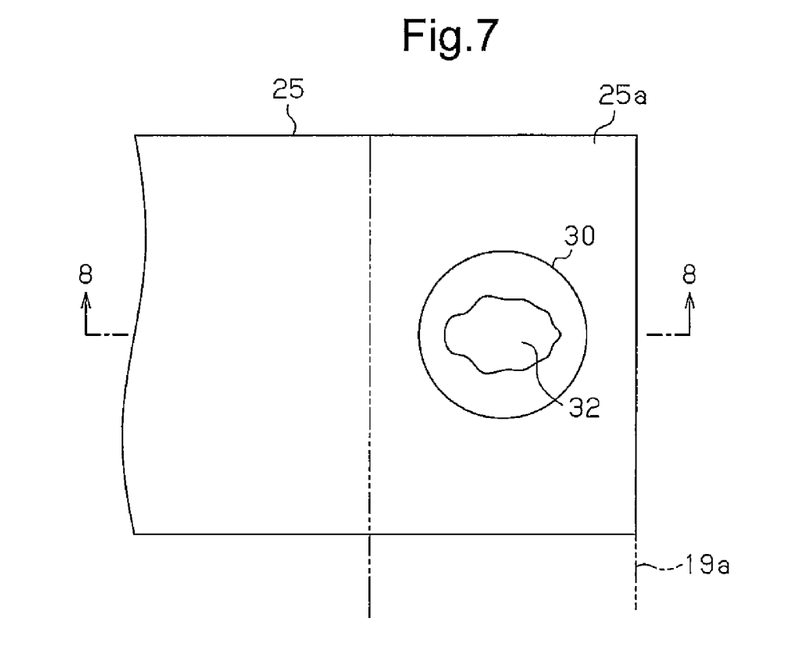
FIG. 7 is an explanatory view illustrating a form of a mixed portion that is formed of the dissimilar metal and metal of a metal foil of an electrode in the conductive member or of the dissimilar metal and a metal of the conductive member.
Figure 8:
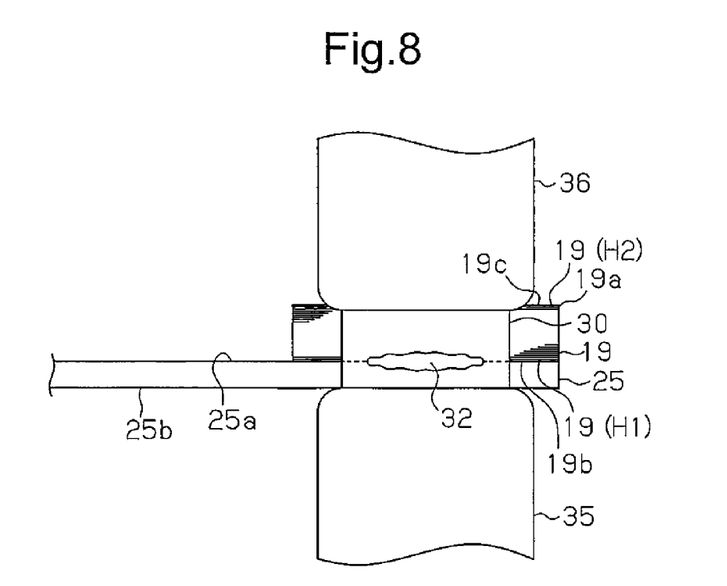
FIG. 8 is a cross-sectional view taken along line 8-8 of FIG. 7, illustrating the tab group and the conductive member in the state after the welding is performed.

As shown in FIGS. 7 and 8, the first welding electrode 35 and the second welding electrode 36 compress the negative electrode tab group 19a and the negative electrode conductive member 25 and current flows between the first welding electrode 35 and the second welding electrode 36. This welds the negative electrode tab group 19a and the negative electrode conductive member 25. The compression by the first welding electrode 35 and the second welding electrode 36 bundles the negative electrode tab group 19a from the negative electrode tab 19 (H2) to the negative electrode tab 19 (H1). This reduces the space between each adjacent pair of the negative electrode tabs 19. The thickness of the negative electrode tab group 19a in the layering direction is reduced to be less than the thickness of the negative electrode tab group 19a prior to the welding shown in FIG. 6.

Resistance heat occurs in the first welding electrode 35, the negative electrode conductive member 25, the negative electrode tab group 19a, and the second welding electrode 36. The resistance heat heats and melts the negative electrode tab group 19a and the negative electrode conductive member 25. The progress of the melting forms a welding portion 30 on the negative electrode tab group 19a and the negative electrode conductive member 25. In the negative electrode tab group 19a and the negative electrode conductive member 25, the region in which the welding portion 30 is formed corresponds to a region extending from the contact region 30a on the surface 25b of the negative electrode conductive member 25, which contacts the first welding electrode 35, toward the contact region 30b on the surface 19c of the negative electrode tab 19 (H2), which contacts the second welding electrode 36. At this time, the melting of the negative electrode tab group 19a and the negative electrode conductive member 25 at the welding portion 30 between the negative electrode tab group 19a and the negative electrode conductive member 25 loses the distinction between the surface 19b and the surface 25a.

The first welding electrode 35 is removed from the negative electrode conductive member 25, the second welding electrode 36 is removed from the negative electrode tab group 19a, and the welding portion 30 on the negative electrode tab group 19a and the negative electrode conductive member 25 is cooled. This joins the negative electrode tab group 19a and the negative electrode conductive member 25 with each other.

As for the positive electrode tab group 15a and the positive electrode conductive member 24, two welding electrodes sandwich the positive electrode tab group 15a and the positive electrode conductive member 24 in the same manner. This welds and joins the positive electrode tab group 15a and the positive electrode conductive member 24 to form a welding portion 29 (FIG. 1). According to the present embodiment, the welding is performed in the state in which the dissimilar metal member 31 is not located between the positive electrode tab group 15a and the positive electrode conductive member 24.

Hereinafter, operations of the rechargeable battery 10 according to the present embodiment will be described.

The welding between the negative electrode tab group 19a and the negative electrode conductive member 25 increases the temperature of the dissimilar metal member 31 located between the negative electrode tab group 19a and the negative electrode conductive member 25. This melts the dissimilar metal member 31. The heating of the dissimilar metal member 31 also increases the temperatures of the negative electrode tab group 19a and the negative electrode conductive member 25 to be high. This promotes the melting of the negative electrode tab group 19a and the negative electrode conductive member 25.

As the dissimilar metal member 31 melts, in the vicinity of the region in which the dissimilar metal member 31 is located, the mixed portion 32 is formed across the negative electrode tab group 19a and the negative electrode conductive member 25 by mixing the copper that forms the negative electrode metal foil 17, the metal that forms the negative electrode conductive member 25, and the dissimilar metal. That is, the mixed portion 32 is across the negative electrode tab group 19a and the negative electrode conductive member 25. Specifically, the portions of the negative electrode tab group 19a and the negative electrode conductive member 25 in which the mixed portion 32 is located occupy a part of the welding portion 30 in either the direction along the surfaces 25a and 25b of the negative electrode conductive member 25 or the direction in the layering direction of the negative electrode tab group 19a. That is, in the negative electrode tab group 19a and the negative electrode conductive member 25, when the negative electrode tab group 19a and the negative electrode conductive member 25 are welded, the amount of the dissimilar metal member 31 located between the negative electrode tab group 19a and the negative electrode conductive member 25 is set such that the region of the mixed portion 32 is smaller than the region of the welding portion 30. Accordingly, the mixed portion 32 is less likely to intercept the range of the current flow of the negative electrode tab group 19a and the negative electrode conductive member 25.

As described above, the present embodiment has the following advantages.

(1) The dissimilar metal member 31 is located between the negative electrode tab group 19a and the negative electrode conductive member 25. The heating of the dissimilar metal member 31 between the negative electrode tab group 19a and the negative electrode conductive member 25 promotes the welding between the negative electrode tab group 19a and the negative electrode conductive member 25. This limits the loss of power in the rechargeable battery 10 due to poor welding between the negative electrode tab group 19a and the negative electrode conductive member 25.

(2) For example, in the welding portion 30 between the negative electrode tab group 19a and the negative electrode conductive member 25, when the region of the mixed portion 32 occupies the entire welding portion 30, current is less likely to flow between the negative electrode tab group 19a and the negative electrode conductive member 25 due to the mixed portion 32. This may reduce the performance of the rechargeable battery 10. Further, when the region of the mixed portion 32 occupies the entire welding portion 30 in the same manner, the amount of heat generated from the nickel as the metal of the dissimilar metal member 31 at the time of the welding becomes excessive. This may cause scattering of microparticles of the metal (spatter). The scattering of the microparticles may also cause loss of power in the rechargeable battery 10.

According to the present embodiment, in the negative electrode tab group 19a and the negative electrode conductive member 25, the region of the mixed portion 32 is smaller than the region of the welding portion 30. This limits a phenomenon that the current is less likely to flow and the occurring of loss of power in the rechargeable battery 10 due to the scattering of the microparticles.

(3) The mixed portion 32 extends across the negative electrode tab group 19a and the negative electrode conductive member 25. Accordingly, the welding increases the temperatures of the negative electrode tab group 19a and the negative electrode conductive member 25 to be high. This appropriately welds the negative electrode tab group 19a and the negative electrode conductive member 25 and limits the occurring of the loss of power in the rechargeable battery 10 due to the poor welding between the negative electrode tab group 19a and the negative electrode conductive member 25.

(4) As the dissimilar metal contained in the mixed portion 32, a metal is employed that includes nickel, which has a higher electric resistivity than that of copper, which is a material of the negative electrode metal foil 17 forming the negative electrode tab group 19a. This appropriately welds the negative electrode tab group 19a and the negative electrode conductive member 25. This further limits the occurring of loss of power in the rechargeable battery 10 due to poor welding between the negative electrode tab group 19a and the negative electrode conductive member 25.

The above embodiment may be modified as necessary in the following manners.

The region of the surface 25a on which the dissimilar metal member 31 is provided in the direction along the surfaces 25a and 25b of the negative electrode conductive member 25 may be sized as large as the contact region 30a of the surface 25b, which contacts the first welding electrode 35, i.e., the region of the surface 25b on which the welding portion 30 is formed.

In the direction along the surfaces 25a and 25b of the negative electrode conductive member 25, the mixed portion 32 between the negative electrode tab group 19a and the negative electrode conductive member 25 may be formed over the entire region of the welding portion 30. In the layering direction of the negative electrode tab group 19a, the mixed portion 32 in the range from the surface 25b of the negative electrode conductive member 25 to the surface 19c of the negative electrode tab 19 (H2) of the negative electrode tab group 19a may be formed over the entire region of the welding portion 30. In such a form, it is necessary to set the amount of the dissimilar metal member 31 located between the negative electrode conductive member 25 and the negative electrode tab group 19a such that the mixed portion 32 is formed on a desired region.

The dissimilar metal member 31 may be located on a boundary between an adjacent pair of the negative electrode tabs 19 in the negative electrode tab group 19a. In such a form, however, to appropriately apply the heat caused by the melting of the dissimilar metal member 31 to the welding between the negative electrode tab group 19a and the negative electrode conductive member 25, it is desirable that the dissimilar metal member 31 be located between the adjacent pair of the negative electrode tabs 19 that are layered at a position of the negative electrode tab group 19a in the vicinity of the negative electrode conductive member 25 such as a position between the negative electrode tab 19 (H1) and the negative electrode tab 19, which is layered at a closer position to the negative electrode tab 19 (H2) than the negative electrode tab 19 (H1) is by one tab in the negative electrode tab group 19a.

As a method of locating the dissimilar metal member 31 between the negative electrode tab group 19a and the negative electrode conductive member 25, a method of plating the negative electrode tab 19 (H1) in the negative electrode tab group 19a with the dissimilar metal may be employed. The plating need not be performed on the negative electrode conductive member 25 and the negative electrode tab group 19a, and the dissimilar metal member 31 may be located separate from them.

Of the negative electrode tab group 19a and the negative electrode conductive member 25, the mixed portion 32 may be formed only on the negative electrode tab group 19a or only on the negative electrode conductive member 25. That is, the mixed portion 32 may be formed of the metal of the dissimilar metal member 31 and the metal of at least one of the negative electrode tab group 19a and the negative electrode conductive member. Even in such a form, the heat caused by the melting of the dissimilar metal member 31 is applied to the welding between the negative electrode tab group 19a and the negative electrode conductive member 25. This limits the occurring of the poor welding between the negative electrode tab group 19a and the negative electrode conductive member 25.

As the dissimilar metal member 31, a member formed of metal containing tin may be employed. Further, as the dissimilar metal member 31, a member formed of metal other than nickel and tin may be employed. That is, any member may be employed as long as the member contains a metal having a higher electric resistivity than that of copper, which is a material of the negative electrode metal foil 17 forming the negative electrode tab group 19a.

As the negative electrode metal foil 17, a foil formed of metal other than the copper may be employed. In such a form, as the metal forming the dissimilar metal member 31, it is necessary to employ a metal that has a higher electric resistivity than that of the metal forming the negative electrode metal foil 17.

The dissimilar metal member 31 may be located between the positive electrode tab group 15a and the positive electrode conductive member 24 to weld the positive electrode tab group 15a and the positive electrode conductive member 24. As the dissimilar metal member 31 in such a form contains a metal that has a higher electric resistivity than that of aluminum, which is the metal of the positive electrode metal foil 13 forming the positive electrode tab group 15a. As the positive electrode tab group 15a and the positive electrode conductive member 24 are welded, a region corresponding to the mixed portion 32 is formed on the welding portion 29.

As the positive electrode metal foil 13, a foil that is formed of metal other than aluminum may be employed. In such a case, when the dissimilar metal member 31 is located between the positive electrode tab group 15a and the positive electrode conductive member 24 to weld the positive electrode tab group 15a and the positive electrode conductive member 24, it is necessary to employ, as the metal forming the dissimilar metal member 31, a metal that has a higher electric resistivity than that of the metal forming the positive electrode metal foil 13.

Each positive electrode 12 may include a positive electrode active material layer 14 configured by applying positive electrode active materials to only one side of the positive electrode metal foil 13. At this time, it is necessary to layer the positive electrodes 12 such that the positive electrode active material layer 14 faces the negative electrode active material layer 18.

Each negative electrode 16 may include a negative electrode active material layer 18 configured by applying negative electrode active materials to only one side of the negative electrode metal foil 17. At this time, it is necessary to layer the negative electrodes 16 such that the negative electrode active material layer 18 faces the positive electrode active material layer 14.

In the illustrated embodiment, the rechargeable battery 10 is a rechargeable lithium-ion battery. However, the rechargeable battery 10 is not limited to this. Other rechargeable batteries may be used. That is, any rechargeable battery may be employed as long as ions move between the positive electrode active material layer and the negative electrode active material layer and the electric charge is transferred.

In the rechargeable battery 10, the positive electrode tab group 15a and the negative electrode tab group 19a may be provided on different edges of the electrode assembly 11. For example, in the electrode assembly 11, when the positive electrode tab group 15a is provided on the edge 11a, the negative electrode tab group 19a may be provided on the edge opposite to the edge 11a (i.e., the edge that faces the bottom wall of the case body 22 in the above embodiment). The rechargeable battery 10 is not limited to the layered type. A winding type rechargeable battery in which a band-like positive electrode and a band-like negative electrode are wound and layered may be employed.

The present invention may be embodied by electricity storage devices such as an electric double layer capacitor.

The invention claimed is:
1. An electricity storage device comprising:
first electrodes, each of which includes a metal foil to which an active material is applied, wherein the metal foil includes a tab shaped to protrude from an edge of the metal foil;
second electrodes, each of which includes a metal foil to which an active material is applied, wherein the metal foil includes a tab shaped to protrude from an edge of the metal foil, and the second electrodes have a polarity that is different from a polarity of the first electrodes;
an electrode assembly configured such that the first electrodes and the second electrodes are layered in a state in which the first electrodes and the second electrodes are insulated from each other;
two electrode terminals, wherein one of the electrode terminals transfers electricity to and receives electricity from the first electrodes, and the other electrode terminal transfers electricity to and receives electricity from the second electrodes;
two conductive members electrically connected to the electrode assembly and the corresponding electrode terminals;
two tab groups provided in the electrode assembly, wherein one of the tab groups is configured by bundling the tabs of the first electrodes having the same polarity, and the other tab group is configured by bundling the tabs of the second electrodes having the same polarity; and
a case, which accommodates the conductive member and the electrode assembly, wherein each tab group and the corresponding conductive member are welded by a welding portion,
the welding portion has a mixed portion configured by mixing at least one of a metal that forms the metal foil and a metal that forms the conductive member with a dissimilar metal that is different from the metal of the metal foil and has a higher electric resistivity than that of the metal of the metal foil, and
a region of the mixed portion is smaller than a region of the welding portion in a direction along a surface on the conductive member, which is joined to the corresponding tab group.
2. The electricity storage device according to claim 1, wherein the mixed portion extends from each tab group to the corresponding conductive member.
3. The electricity storage device according to claim 1, wherein the dissimilar metal is a metal that includes nickel or tin.
4. The electricity storage device according to claim 1, wherein the electricity storage device is a rechargeable battery.
5. A welding method for joining a tab group, in which tabs extending from metal foils are bundled, with a conductive member, which is electrically connected to the tab group, by welding at edges of electrodes, which configure an electrode assembly having a layered structure, the method comprising:
providing a dissimilar metal member between the tab group and the conductive member, wherein the dissimilar metal member has a higher electric resistivity than an electric resistivity of a metal of the metal foils and is formed of a metal of a type that is different from a type of the metal of the metal foils, and a region of the dissimilar metal member is smaller than a contact region between the conductive member and a first welding electrode, which is arranged in contact with the conductive member;
sandwiching the tab group and the conductive member between the first welding electrode and a second welding electrode, which is arranged in contact with the tab group; and welding the tab group and the conductive member with each other such that a region to be welded contains a region in which the dissimilar metal member is provided.

6. The welding method according to claim 5, wherein the providing the dissimilar metal member includes plating a surface of the conductive member to provide the dissimilar metal member.

\* \* \* \* \*